(12) United States Patent
Chen et al.

(10) Patent No.: US 11,214,005 B2
(45) Date of Patent: Jan. 4, 2022

(54) SURFACE PROJECTION TOOL FOR MULTI-AXIS ADDITIVE MANUFACTURING

(71) Applicant: University of Southern California, Los Angeles, CA (US)

(72) Inventors: Yong Chen, Los Angeles, CA (US); Xiangjia Li, Los Angeles, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 665 days.

(21) Appl. No.: 15/868,891

(22) Filed: Jan. 11, 2018

(65) Prior Publication Data
US 2018/0194064 A1 Jul. 12, 2018

Related U.S. Application Data

(60) Provisional application No. 62/445,679, filed on Jan. 12, 2017.

(51) Int. Cl.
| | | |
|---|---|---|
| *B29C 64/277* | (2017.01) | |
| *B29C 64/135* | (2017.01) | |
| *B33Y 50/02* | (2015.01) | |
| *B33Y 10/00* | (2015.01) | |
| *B33Y 30/00* | (2015.01) | |
| *B29C 64/393* | (2017.01) | |

(52) U.S. Cl.
CPC .......... *B29C 64/277* (2017.08); *B29C 64/135* (2017.08); *B29C 64/393* (2017.08); *B33Y 10/00* (2014.12); *B33Y 30/00* (2014.12); *B33Y 50/02* (2014.12)

(58) Field of Classification Search
CPC ... B29C 64/277; B29C 64/393; B29C 64/135; B33Y 10/00; B33Y 30/00; B33Y 50/02
USPC ........................................................ 264/401
See application file for complete search history.

(56) References Cited

U.S. PATENT DOCUMENTS

| | | | | |
|---|---|---|---|---|
| 5,236,326 A | * | 8/1993 | Grossa | B29C 64/135 425/174.4 |
| 2011/0089610 A1 | * | 4/2011 | El-Siblani | B33Y 70/00 264/401 |
| 2013/0037993 A1 | * | 2/2013 | Chen | B29B 13/08 264/401 |

OTHER PUBLICATIONS

Wikipedia; "*Digital micromirror device*"; https://en.wikipedia.org/wiki/Digital_micromirror_device (3 pages).

* cited by examiner

*Primary Examiner* — Jeffrey M Wollschlager
*Assistant Examiner* — Xue H Liu
(74) *Attorney, Agent, or Firm* — Snell & Wilmer LLP

(57) ABSTRACT

Methods, systems, and devices including a light guide tool for multi-axis additive manufacturing. The light guide tool includes a tubular light guide. The tubular light guide may be made from an optically transmissive material enclosed by one or more reflective side walls that are interposed between opposing optically transmissive ends. The light guide tool includes an optical coupling fixed to a first end of the optically transmissive ends of the tubular light guide. The optical coupling is configured to couple to a lens. The light guide tool includes a transparent non-stick coating. The transparent non-stick coating is adhered over a second end of the optically transmissive ends of the tubular light guide. The light guide tool includes a lens. The lens is coupled to the optical coupling and configured to emit a two-dimensional light pattern.

17 Claims, 11 Drawing Sheets

SURFACE PROJECTION TOOL FOR MULTI-AXIS ADDITIVE MANUFACTURING

CROSS-REFERENCE TO RELATED APPLICATIONS

This application claims priority to and the benefit of U.S. Provisional Patent Application No. 62/445,679 titled "SURFACE PROJECTION TOOL AND METHOD FOR MULTI-AXIS ADDITIVE MANUFACTURING," filed on Jan. 12, 2017, and the entirety of which is hereby incorporated by reference herein.

BACKGROUND

1. Field

This specification relates to a system, device and/or a method for additive manufacturing using stereolithography apparatus (SLA) materials.

2. Description of the Related Art

Additive manufacturing builds three-dimensional (3D) objects by adding layer-upon-layer of material, whether the material is plastic, metal, concrete or other material. Additive manufacturing has numerous applications including 3D printing, rapid prototyping, direct digital manufacturing, layered manufacturing and/or additive fabrication. Additive manufacturing depends on accumulating material layer-upon-layer, such as by stereolithography (SLA) or selective laser sintering (SLS). The traditional additive manufacturing process, however, results in a stair-stepping effect when fabricating the 3D object.

A layerless additive manufacturing process may mitigate or reduce the stair-stepping effect. The layerless additive manufacturing process may be a point-based Computer Numerical Control (CNC) accumulation process, such as the CNC accumulation process disclosed in U.S. Pat. No. 9,221,216, which is hereby incorporated by reference. As shown in FIG. 1, CNC accumulation uses an accumulation tool to cure material that the accumulation tool touches. Hence, the constructed shape will be $M=U(T)_{Si+Oj}$. Since the material rapidly cures as the accumulation tool moves, there is no obvious stair effect on the surface of model. The accumulation tool of the point based CNC accumulation process, however, is limited in size and the amount of resolution control, and thus, cannot be utilized to fabricate micro-features with high resolution and efficiency. The point-based CNC accumulation process has difficulty in achieving high resolutions, especially for the fabrication of textures with micro-scale features.

Accordingly, there is a need for a system, apparatus and/or a method to accomplish high-resolution fabrication within a short time duration.

SUMMARY

In general, one aspect of the subject matter described in this specification is embodied in a light guide tool for multi-axis additive manufacturing. The light guide tool includes a tubular light guide. The tubular light guide may be made from an optically transmissive material enclosed by one or more reflective sidewalls that are interposed between opposing optically transmissive ends. The light guide tool includes an optical coupling fixed to a first end of the optically transmissive ends of the tubular light guide. The optical coupling is configured to couple to a lens. The light guide tool includes a transparent non-stick coating. The transparent non-stick coating is adhered over a second end of the optically transmissive ends of the tubular light guide. The light guide tool includes a lens. The lens is coupled to the optical coupling and configured to emit a two-dimensional light pattern.

These and other embodiments may optionally include one or more of the following features. The tubular light guide may be an acrylic rod. The transparent non-stick coating may be a polydimethylsiloxane material or Teflon film. Each end of the optically transmissive ends of the tubular light guide may be defined by a flat surface. The flat surface may have an area in the range of 1-2000 mm². The tubular light guide, the optical coupling and the lens may be arranged so that the second end of the optically transmissive ends is located at the working distance of objective lens.

In another aspect of the subject matter is embodied in a method for multi-axis additive manufacturing using light emitted over a two-dimensional surface of a tool. The method includes immersing a solid accumulation surface in a liquid stereolithography (SLA) resin. The method includes positioning a free end of a light-emitting arm to within an initial distance of the solid accumulation surface under the SLA resin. The method includes emitting a two-dimensional light pattern from an area of the free end of the light-emitting arm to cure a portion of the SLA resin between the area of the free end and the solid accumulation surface.

In another aspect, the subject matter is embodied in an additive manufacturing system. The additive manufacturing system includes a light source for emitting an illumination beam having a two-dimensional light pattern. The additive manufacturing system includes a substrate holder having a cavity, a portion of the cavity being filled by the light guide tool. The additive manufacturing system includes a platform for holding a fabricated object immersed within the substrate in the substrate holder. The additive manufacturing system includes a light guide tool for emitting the illumination beam through the substrate in the substrate holder. The additive manufacturing system includes a motor for controlling motion of at least one of the platform or the light guide tool. The additive manufacturing system includes a processor connected to the motor. The processor is configured to control the motor to move the at least one of the platform or the light guide tool in a plurality of directions and rotate the at least one of the platform or the light guide tool about a plurality of axis.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Disclosed herein are systems, devices and methods for an additive manufacturing system using computer numerical control (CNC) accumulation. By using CNC accumulation when performing additive manufacturing, the additive manufacturing system reduces, minimizes and/or eliminates the stair-stepping effect that exists in the traditional layer-based approach for additive manufacturing. Thus, the additive manufacturing system can continuously fabricate the textures without using layers.

Moreover, the additive manufacturing system may use surface-based CNC accumulation, which achieves a higher-resolution fabrication within a shorter time. A surface projection tool (or light guide tool) may apply the surface-based CNC accumulation to accomplish a high-resolution fabrication within shorter time, e.g., by dynamically projecting a pixel array image (e.g., 1920×1080 pixels) while immersed in liquid resin. The surface projection tool uses surface-based CNC accumulation to control light energy via projecting high-resolution images to accurately fabricate 3D features with micro-scale geometries on the surface of complex objects. An additive manufacturing system having the surface projection tool using surface-based CNC accumulation can achieve high speed and micro-scale resolution, which shows significant advantages over existing fabrication technologies. The projection image, for example, can have high resolution of at least 2.5 μm/pixel.

Other benefits and advantages include that the surface projection tool can be used to continuously accumulate geometric features with fast frequency mask video image so that the surface quality of the model can be smooth and can reach a resolution of 1 μm.

Figure 1:
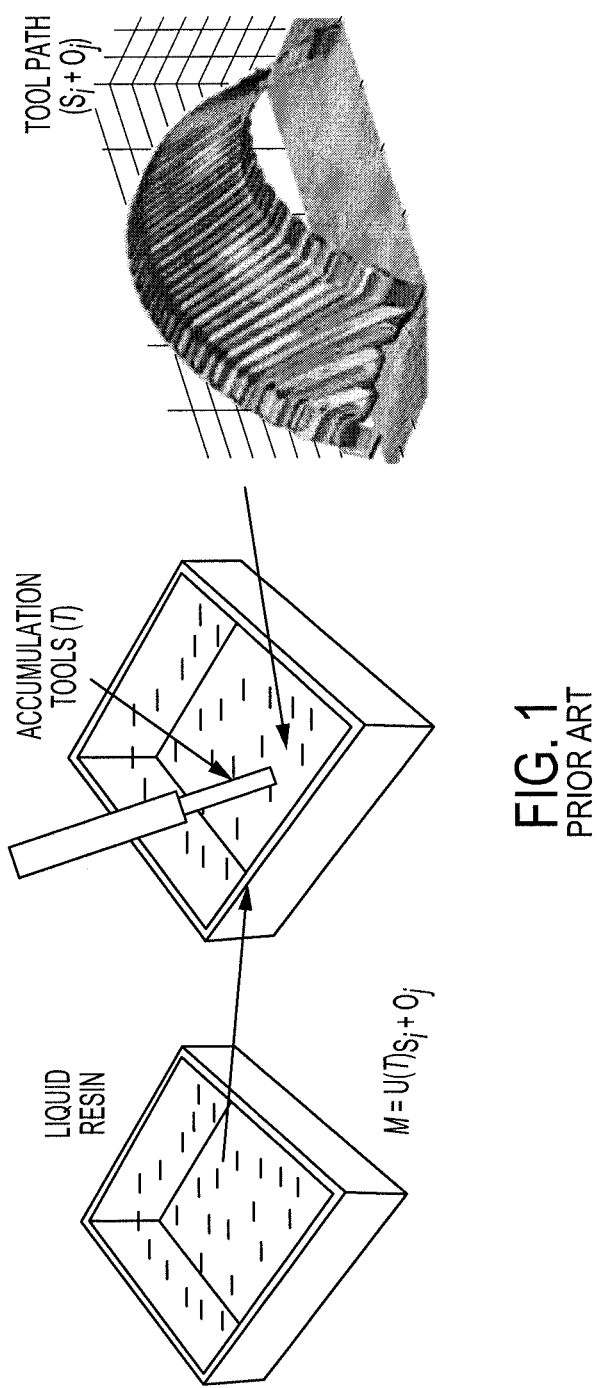
FIG. 1 shows the principle of CNC accumulation in additive manufacturing according to an aspect of the invention.
Figure 2:
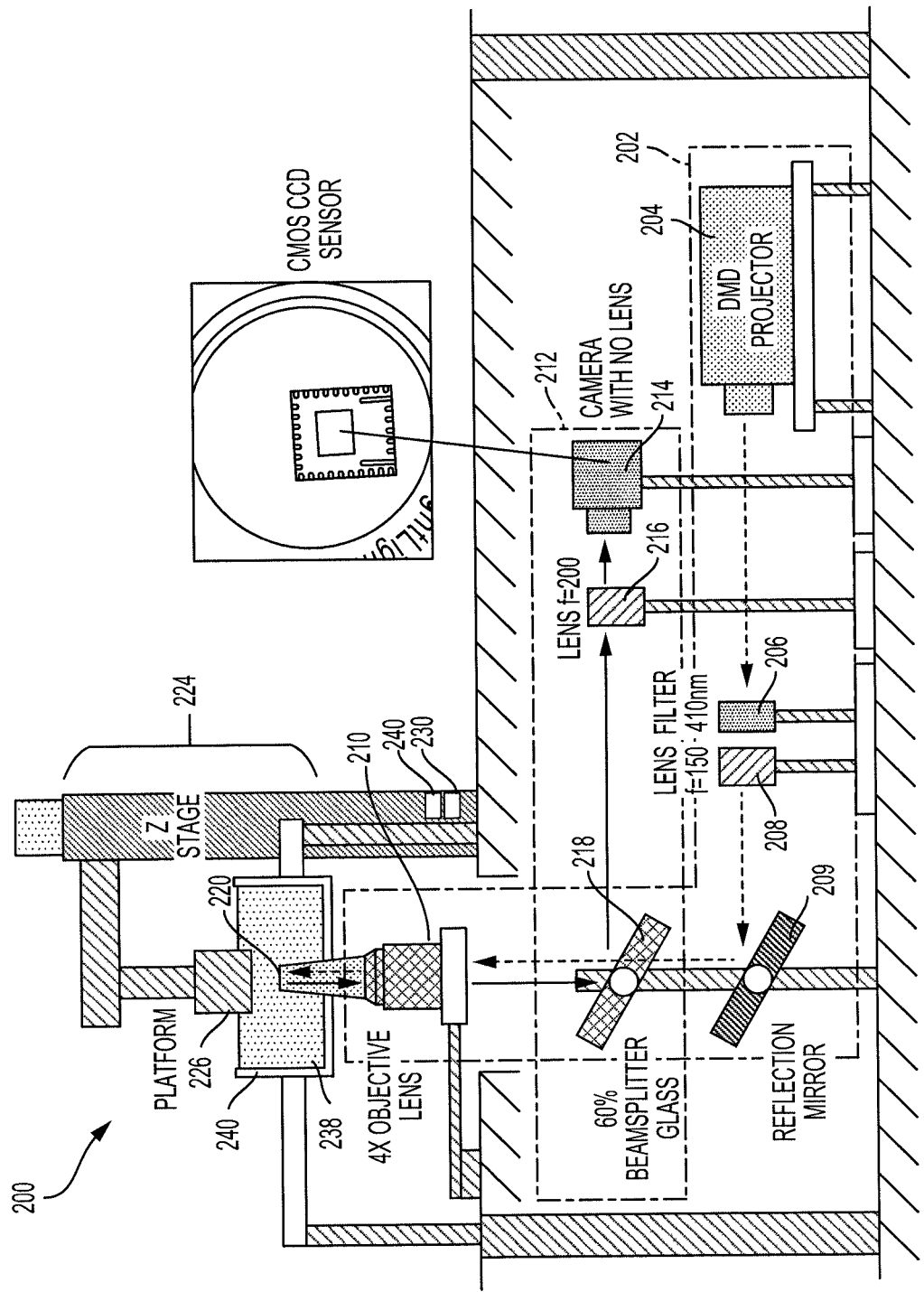
FIG. 2 shows an example additive manufacturing system using surface-based computer numerical control (CNC) accumulation according to an aspect of the invention.

FIG. 2 shows an additive manufacturing system 200 using surface-based computer numerical control (CNC) accumulation. The additive manufacturing system 200 includes one or more apparatuses including an optical apparatus 202, a visual detection apparatus 212, a mechatronics apparatus 224 and a light guide tool 220, otherwise known as a surface projection tool. The additive manufacturing system may include a substrate holder 240 where the substrate 238 is held. An object 902 may be partially or fully immersed within the substrate 238.

Figure 3:
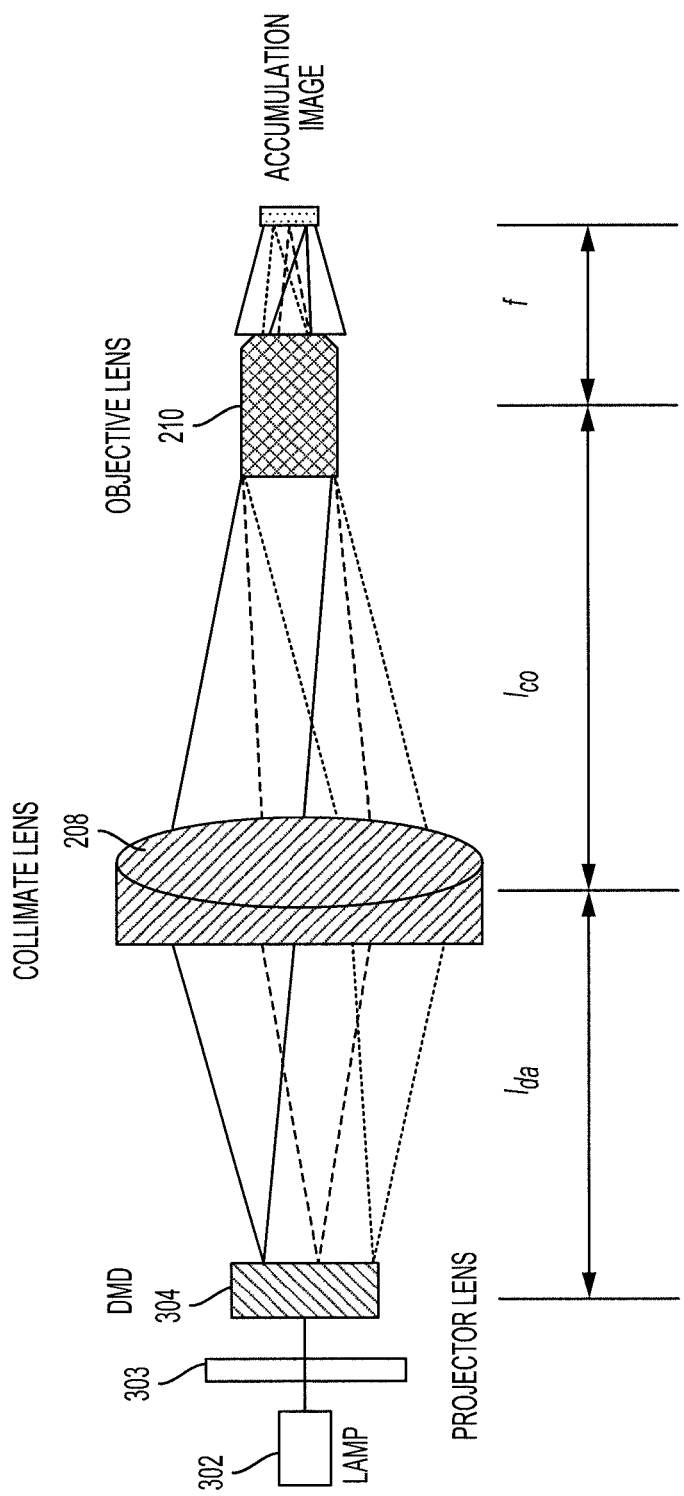
FIG. 3 shows an example optical apparatus for the additive manufacturing system of FIG. 2 according to an aspect of the invention.
Figure 4:
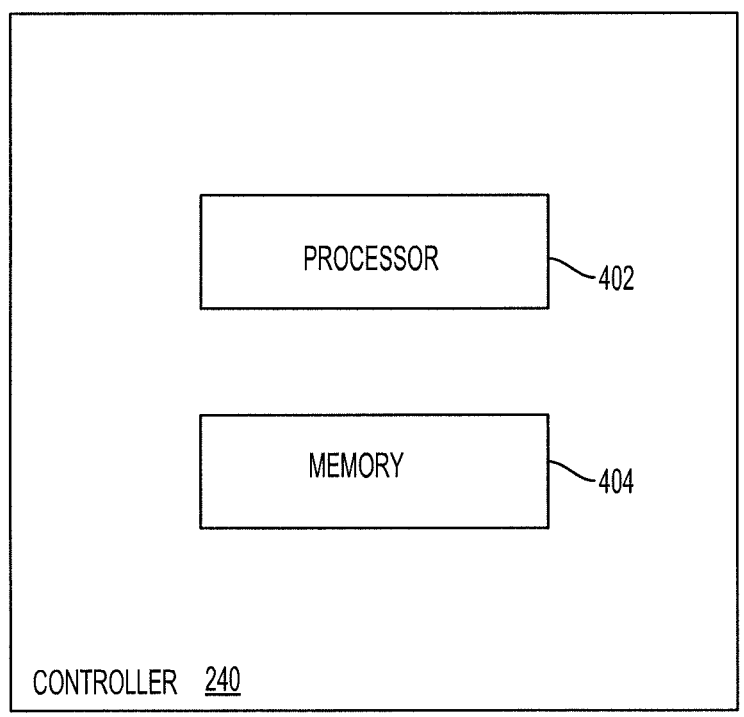
FIG. 4 shows an example controller of the additive manufacturing system of FIG. 2 according to an aspect of the invention.

The optical apparatus 202 includes a Digital Micromirror Device (DMD) projector 204 and one or more lenses 206, 208, 210. The DMD projector 204 includes a DMD chip 304 and a lamp 302 for light input, as shown in FIG. 3 for example. The DMD projector 204 may include a projector lens 303. The DMD projector 204 projects an illumination beam with a 2-dimensional shape that is projected onto a layer of substrate. The optical apparatus 202 may include a reflection mirror 209.

The lamp 302 may be a projector bulb. The lamp may provide a light source having a power of approximately 2500 lumen, although higher and lower powers are possible. The lamp 302 may provide a light source that emits light equally in all directions, and to recapture all the energy of the light from the lamp, the projector lens 303 may collimate the light before the light irradiates the DMD chip 304. The projector 303 may bring into line or make parallel the light before irradiating the DMD chip 304.

The DMD chip 304 has several hundred thousand microscopic mirrors arranged in array, such as a rectangular array, which correspond to pixels in an image to be displayed. The mirrors can be individually rotated ±10-12° to toggle the mirrors between an on and off state. When the DMD projector 204 is in the on state, a light, such as from a lamp 302 or projector bulb within the DMD projector 204, may be reflected into the one or more lens 206, 208, 210 making the pixel appear bright on a screen. When in the off state, the light is directed elsewhere making the pixel appear dark. The DMD projector 204 emits the light through to the one or more lenses 206, 208, 210. The DMD chip 304 may have a resolution of 1920×1080. Accordingly, the additive manufacturing system 200 may have a resolution of 2.5 μm/pixel, although higher and lower resolutions are possible.

The optical apparatus 202 includes one or more lenses 206, 208, 210. The one or more lenses 206, 208, 210 may be arranged in series and collimate and/or focus the illumination beam from the lamp 302 exiting the DMD projector 204. The one or more lenses 206, 208, 210 may include a filter lens 206, an achromatic doublets lens 208 and/or an objective lens 210.

The filter lens 206 may receive the illumination beam and reduce the amount of distortion within the illumination beam. The filter lens 206 may block or filter out most of the light except for a designated wavelength, such as a wavelength of 410 nm. The illumination beam may pass through the filter lens 206 to the achromatic doublets lens 208.

The achromatic doublets lens 208 may collimate, focus and converge the light beams within the illumination beam. The achromatic doublets lens 208 may have a focus distance of 150 mm. A distance between the DMD projector 204 and the achromatic doublets lens 208 may be set equal to the focus distance of the achromatic doublets lens 208.

The objective lens 210 may receive the illumination beam from the achromatic doublets lens 208 that has collimated the illumination beam. The objective may be a 4x objective lens with a focus distance of 15 mm, which scales the image within the illumination beam to a suitable dimension. The objective lens 210 projects the illumination beam through to the light guide tool 220.

The reflection mirror 209 may reflect or otherwise redirect the collimated illumination beam projected out of the achromatic doublets lens 208 to the objective lens 210. By redirecting the collimated illumination beam, the additive manufacturing system 100 may be formed in a compact design that minimizes the volume or area of the additive manufacturing system 100 to allow for compact placement of the additive manufacturing system 100.

The additive manufacturing system 100 may include a visual detection apparatus 212. The visual detection apparatus 212 enables observation of the image that is projected through the substrate 238 and forms micro-features on the object. The visual detection apparatus 212 may include a camera 214, a magnification lens 216 and/or a beam splitter 218. The visual detection apparatus 212 may include a display, such as a computer monitor. The illumination beam with the image may be directed from the objective lens 210 to the beam splitter 218. The beam splitter 218 may split the illumination beam into one or more beams and reflect the light to the magnification lens 216. The magnification lens 216 may receive the one or more beams from the beam splitter 218 and magnify the image. The magnification lens 216 may be an achromatic doublets lens. The magnification lens 216 may magnify the image and project the image to the camera 214. The camera 214 may be a complementary metal-oxide-semiconductor (CMOS) charge coupled device (CCD) sensor. The camera 214 may display the projected image onto a display, such as onto a computer monitor or personal device.

The additive manufacturing system 100 includes a mechatronics apparatus 224. The mechatronics apparatus 224 may include a motor and/or actuator 230, a platform 226 and/or a controller 240. The controller 240 may have a processor 402 and a memory 404. The processor 402 may cause the motor and/or actuator 230 to move the platform 226 three-dimensionally and in multiple directions including in the X, Y and Z directions and being able to rotate along the X, Y and Z axis. The processor 402 may move the platform 226 according to a program stored in memory 404. The program may use a computer-aided design (CAD) file to control the movement of the platform 226. The platform 226 may be positioned within the substrate 238, such as a resin. As the illumination beam illuminates through the light guide tool 220, the illumination beam cures the substrate 238 onto the object attached to the platform 226. In some implementations, when the additive manufacturing system 200 is fabricating micro-scale structures in multiple directions, the light guide tool 200 is immersed inside the substrate holder 240 and the substrate holder 240 is filled with the substrate 238 from above.

In some implementations, the light guide tool 220 is moved or rotated about the platform 226 in the more than 3 directions and/or is rotated about the X, Y and Z axis. The processor 402 may move or rotate the platform and/or the light guide tool 220 using a numerically controlled multi-axis actuator while the light guide tool 220 emits the two-dimensional light pattern to form the additional layers to cure the substrate to form micro-features onto the object.

The memory 404 may store instructions that the processor executes. The memory 404 may include one or more of a Random Access Memory (RAM) or other volatile or non-volatile memory. The memory 404 may be a non-transitory memory or a data storage device, such as a hard disk drive, a solid-state disk drive, a hybrid disk drive, or other appropriate data storage, and may further store machine-readable instructions, which may be loaded and executed by the processor 402.

Figure 5:
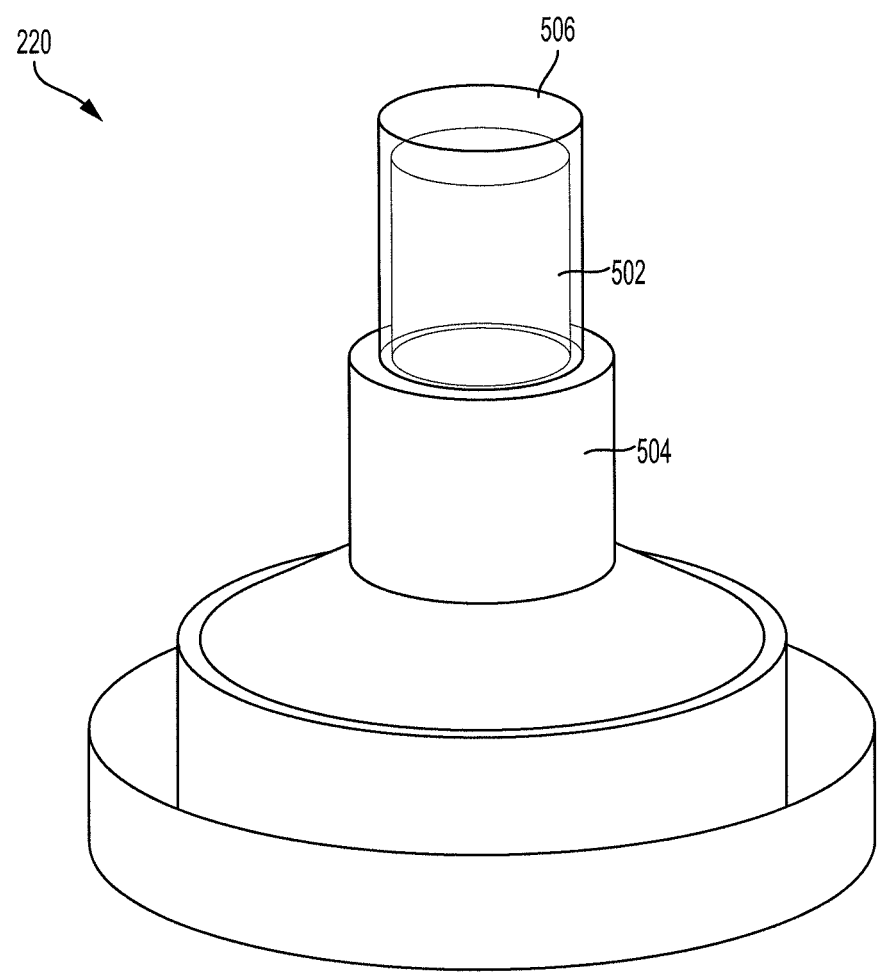
FIG. 5 shows an example light guide tool of the additive manufacturing system of FIG. 2 according to an aspect of the invention.

The additive manufacturing system 100 includes a light guide tool 220. FIG. 5 shows the light guide tool 220. The light guide tool 220 dynamically controls energy input into a surface area defined by the projected images from the DMD projector 204. The light guide tool 220 may propagate the high-resolution image precisely for the surface-based material accumulation. The light guide tool 220 may propagate the high-resolution image through the substrate 238 to form the surface-based material accumulation onto the processing object 902. Since the 2D surface continuously accumulates, the surface quality is better than traditional additive manufacturing and may achieve a high building speed with high resolution for fabrication of micro-scale features.

The light guide tool 220 includes a tubular light guide 502, an optical coupling 504 and a transparent non-stick coating 506. The light guide tool 220 may include a lens, such as the objective lens 210, or the lens may be part of the optical apparatus 202 and/or visual detection apparatus 212 and connected to the light guide tool 220, for example, via the optical coupling 504.

The light guide tool 220 may be made from an optically transmissive material. The optically transmissive material may have one or more reflective side walls 602 that are interposed between opposing optically transmissive ends 604a-b, as shown in FIG. 6B for example. The light guide tool 220 may have an optical coupling 504 that is fixed to one of the optically transmissive ends 604a-b. The optical coupling may connect to a lens, such as the objective lens. The other end of the optically transmissive ends may have a transparent non-stick coating 506 that is adhered. The transparent non-stick coating 506 may be made from a polydimethylsiloxane material or Teflon film. The optically transmissive ends may be defined by a flat surface that has an area in the range of 1-20 mm$^2$.

Figure 6A:
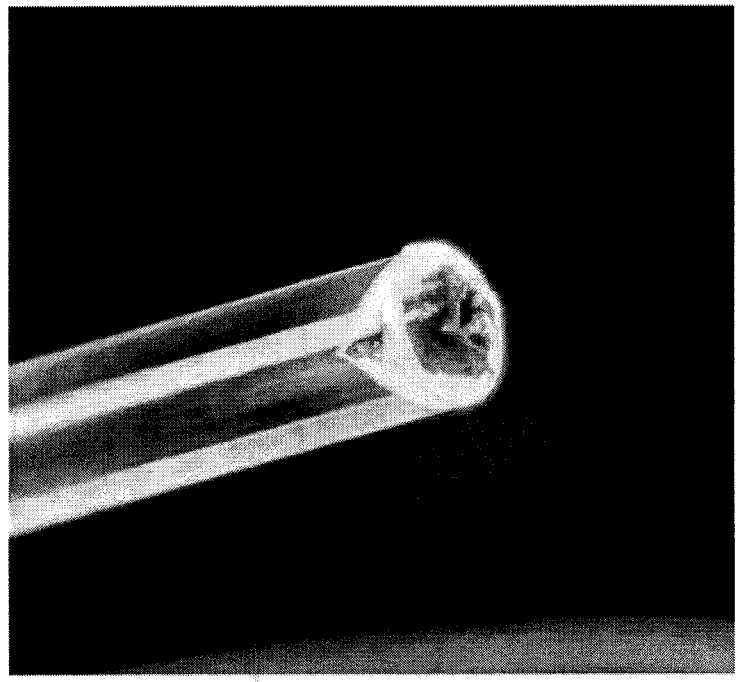
FIGS. 6A-6B shows an example optical fiber as a light guide tool of the additive manufacturing system of FIG. 2 according to an aspect of the invention.
Figure 6B:
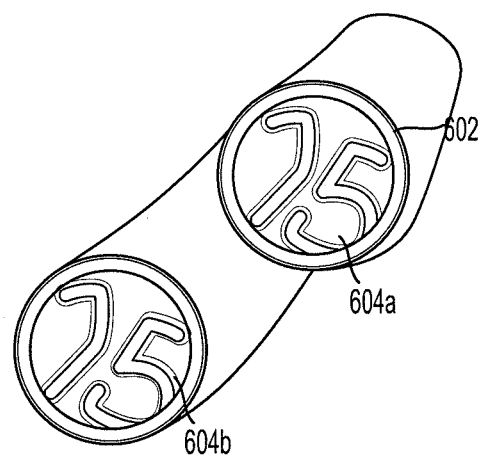
Figure 7:
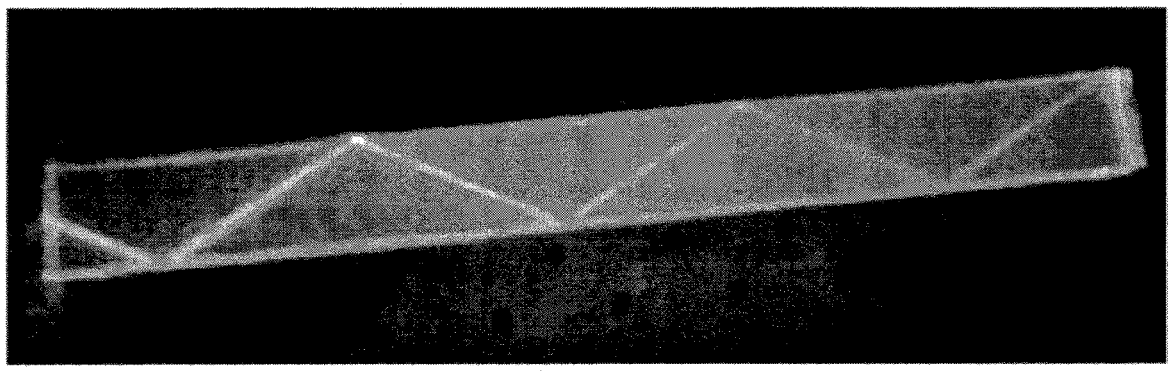
FIG. 7 shows an example acrylic rod as a light guide tool of the additive manufacturing system of FIG. 2 according to an aspect of the invention.

The light guide tool 220 may be made an optical fiber 600, as shown in FIG. 6A-6B for example, or an acrylic rod 700, as shown in FIG. 7 for example. The optical fiber 600 may be flexible. The light guide tool 220 transmits the image and accumulates material by emitting an exposure image on the surface of the object on the platform 226. The light guide tool may 220 be coated with a transparent coating, such as polydimethylsiloxane (PDMS), which prevents the substrate 238, such as the stereolithography (SLA) resin, from adhering to a free end of the optical fiber 600 or the acrylic rod 700. The optical fiber 600 allows the illumination beam to change direction. FIG. 6 shows a perspective view of the optical fiber 600 used to transmit light. The optical fiber 600 may be mounted on top of the objective lens 210 and receive light from the DMD projector 204 that projects the accumulation images.

In some implementations, the light guide tool 220 may be an acrylic rod 700, as shown in FIG. 7 for example. Light may be transmitted through the acrylic rod 700 without any distortion. To generate the accumulation image, the height of the acrylic rod 700 should be equal to the focal distance of the objective lens 210 used. The acrylic rod 700 may be coated with a flat polydimethylsiloxane (PDMS) film with 1~2 mm thickness on the top surface of the acrylic rod 700. The oxygen contained on the coated PDMS layer may prevent the substrate 238 from attaching to the surface of the light guide tool 220.

Figure 8:
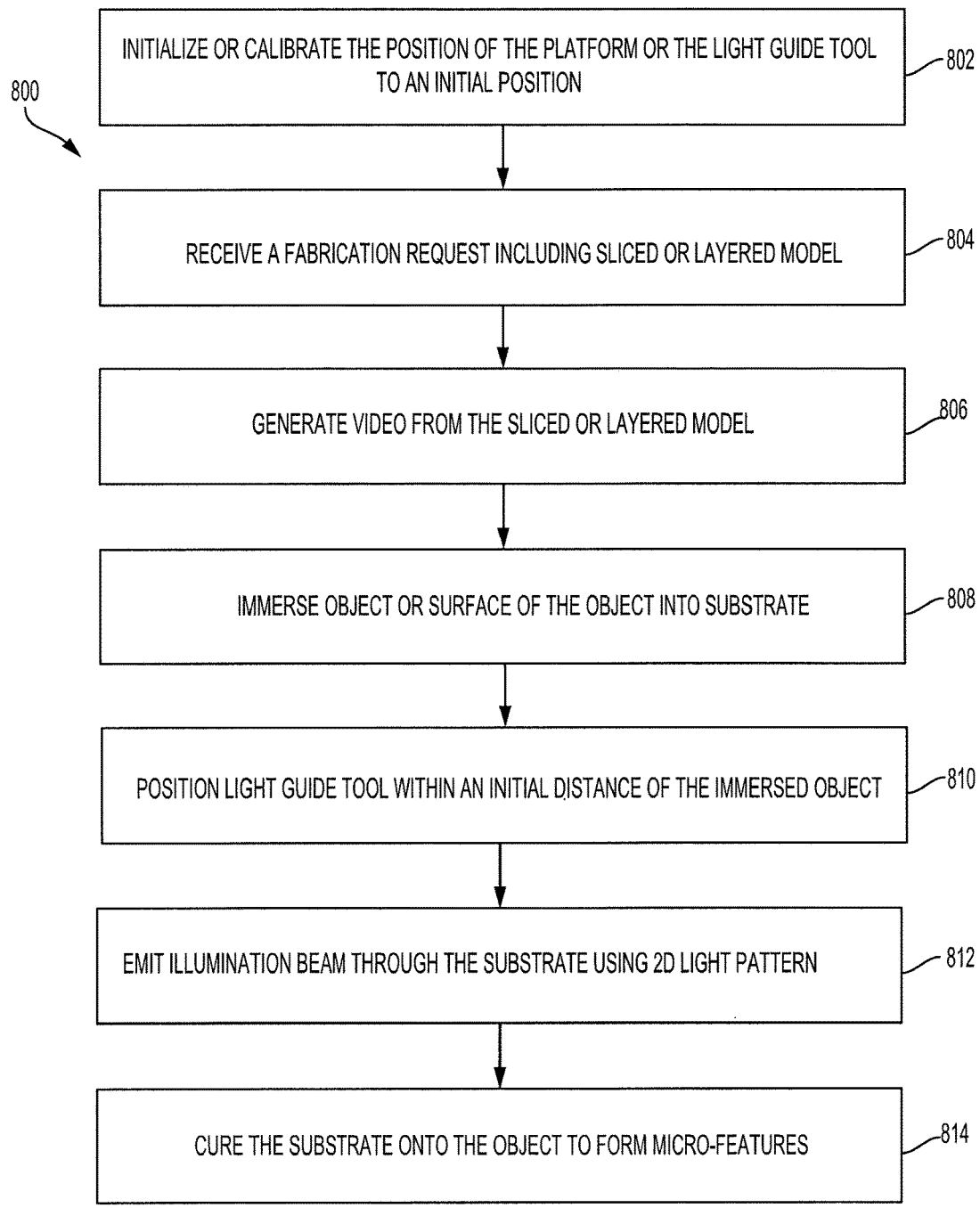
FIG. 8 is a flow diagram of an example process for performing multi-axis additive manufacturing using the light guide tool according to an aspect of the invention.

FIG. 8 is a flow diagram of an example process 800 for performing multi-axis additive manufacturing using the light guide tool 220. One or more computers or one or more data processing apparatuses, for example, the processor 402 of the additive manufacturing system 200 of FIG. 2, appropriately programmed, may implement the process 800.

The additive manufacturing system 100 may initialize the position of the platform 226 or the light guide tool 220 to an initial position to perform calibration (802). The additive manufacturing system 100 may determine the initial position of the platform 226 or the light guide tool 220 and move the platform 226 or the light guide tool 220, respectively, to the initial position. The additive manufacturing system 100 may determine the initial position using the visual detection apparatus 212. The visual detection apparatus 212 calculates a distance between the light guide tool 220 and the object 902 to be fabricated or processed. The object 902 may be newly fabricated or micro-features may be processed to be added to an already fabricated object 902. The visual detection apparatus 212 calculates the distance based on the color of the substrate 238, such as resin, in the captured image. As the distance increases between the light guide tool 220 and the surface of the object 902, the color of the substrate 238 is darker because there is a greater distance between the light guide tool 220 and the surface of the object 902. As the distance decreases between the light guide tool 220 and the surface of the object 902, the color is lighter because there is less distance or thickness of substrate 238 between the light guide tool 220 and the surface of the object 902.

Moreover, when the outer surface of the object 902 touches the surface of the PDMS of the light guide tool 220, the surface of the object 902 replaces the substrate 238 and appears in the captured images. By dynamically performing an image analysis of the captured image, a relationship of the initial distance and the color level is determined and the additive manufacturing system 100 uses the relationship to determine the initial position. The additive manufacturing system 100 may be aligned and/or calibrated when the distance is equal to 0.

Figure 9A:
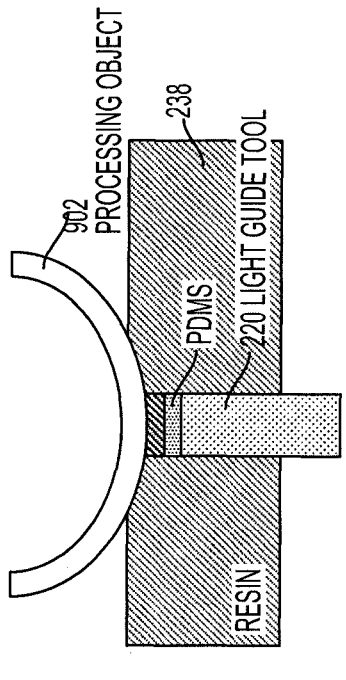
FIGS. 9A-9D show the positioning of a light guide tool of the additive manufacturing system of FIG. 2 according to an aspect of the invention.
Figure 9B:
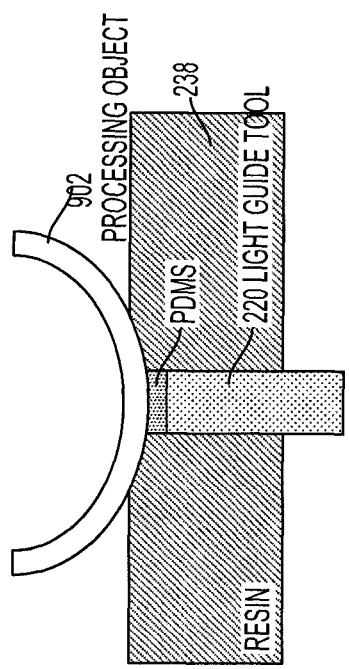

FIG. 9A shows an initial position of the additive manufacturing system 200, in which an initial distance between the light guide tool 220 and the object 902 is 0. FIG. 9B shows the additive manufacturing system at a later time, in which the resin fills in between the processing object 902 and the light guide tool 220 as the light guide tool 220 separates slightly down from the processing object 902.

The additive manufacturing system 100 may receive a fabrication request (804). The fabrication request may include a computer-aided design (CAD) drawing or file. The CAD drawing includes layered or sliced model that depicts the object to be fabricated. The additive manufacturing system 100 may form the layered or sliced model for each of the layers of the object into a video. The additive manufacturing system 100 may generate a video of the layered or sliced model to be played or illuminated by the DMD Projector 204 (806). In some implementations, the video may be generated offline and included in the fabrication request.

The additive manufacturing system 100 immerses the object that is to be fabricated or a surface of the object (or solid accumulation surface) into the substrate 238 (808). The substrate 238 may be a liquid stereolithography (SLA) resin. When light from the light guide tool illuminates a portion of the surface of the object through the substrate 238, the light from the light guide tool 220 cures the substrate onto the surface of the object 902 forming micro-features 904.

The additive manufacturing system 100 positions a free end of the light guide tool within an initial distance of the solid accumulation surface under the SLA resin (810). The additive manufacturing system 100 may move the platform holding the object and/or move the light guide tool to position the light guide tool within the initial distance of the solid accumulation surface. The additive manufacturing 100 may move or rotate the platform and/or the light guide tool 220 using a multi-axis actuator 230 that moves in multiple directions, such as in the X, Y, or Z direction along with being able to rotate along and about each of the X, Y, or Z axis. The solid accumulation surface may include an article of manufacture having one or more surfaces that are not parallel to an upper surface of the substrate that requires the additive manufacturing 100 to move or rotate about the one or more surfaces to add micro-features.

A free end of a light-emitting arm within the light guide tool 220 emits the illumination beam through the substrate to form micro-features on the object (812). The illumination beam may be of a two-dimensional light pattern from an area of the free end of the light-emitting arm. The light-emitting arm may be a tubular light guide 502 that is hollow and may be formed from a rod of optically transmissive material. The DMD projector 204 may project the two-dimensional light pattern, which may be a numerically controlled laser with a two-dimensional light pattern, through the light guide tool and resin onto the solid accumulation surface. The free end of the light-emitting arm may have an array of light emitters that include one or more light-emitting diodes (LEDs) and a liquid-crystal display (LCD) screen.

Figure 9C:
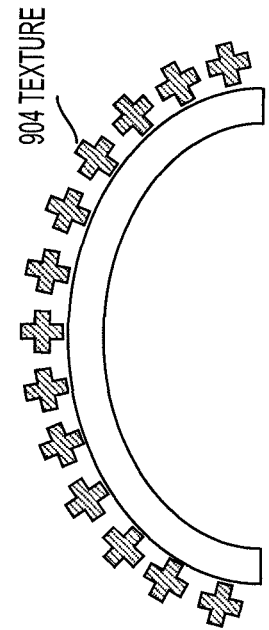
Figure 9D:
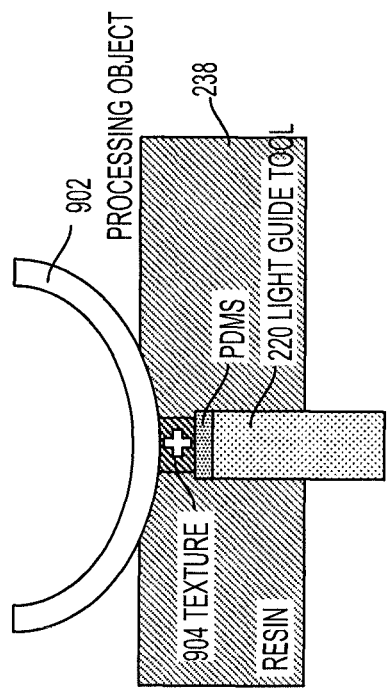

While emitting the illumination beam, the additive manufacturing system 100 moves and/or rotates the platform 226 and/or the light guide tool 220 and cures the substrate onto the solid accumulation surface (814). FIG. 9C shows the fabrication of a single texture or micro-feature 904 at one location on the processing object 902. FIG. 9D shows a result with multiple textures or micro-features 904 built on the surface of processing object 902, by relocating the light guide tool 220 to different locations and orientations using a multi-axis controller, and repeating the curing operations.

For example, the additive manufacturing system 100 may move the free end of the light emitting surface over at least a portion of the layer of cured SLA resin or an article of manufacture at a controlled distance using the numerically controlled multi-axis actuator while emitting the two-dimensional light pattern, thereby forming an additional layer of cured SLA resin. The additional layer may be in a pattern that corresponds to the two-dimensional light pattern. In another example, the additive manufacturing system 100 build up a three-dimensional structure of cured SLA resin over the surface of the solid accumulation surface or the article of manufacture formed of multiple layers of cured SLA resin each formed by moving the free end of the light emitting surface over at least a portion of an underlying layer of cured SLA resin at a controlled distance using the numerically controlled multi-axis actuator while emitting the two-dimensional light pattern.

Concerning an experimental setup, for cure depth calibration, a biocompatible material PEGDA was selected as the photocurable material to test the CNC image accumulation process. Based on the polymerization principle, the classical Beer Lambert's law of the light propagation shows the cure depth follows: $C_d = D_p l_n(E_{max}/E)$.

To fabricate features using the image accumulation process, the fabricated object may be continuously moved away from the light guide tool. There should be sufficient resin and suitable distance between the light guide tool and the surface of the object, which should be less than the cure depth of the resin. The fabrication area of the tested CNC accumulation process was 4×3 mm. Because the light intensity of the accumulation image was 30 mW/cm$^2$, based on the material property and the energy distribution, the cure depth of PEGDA was nearly 100 μm. Based on a series of experiments to identify the best continuous movement speed of processing object for achieving the best surface quality of texture, for the described set-up, the cure depth was verified to be 80 μm/s with full illumination.

Figure 10:
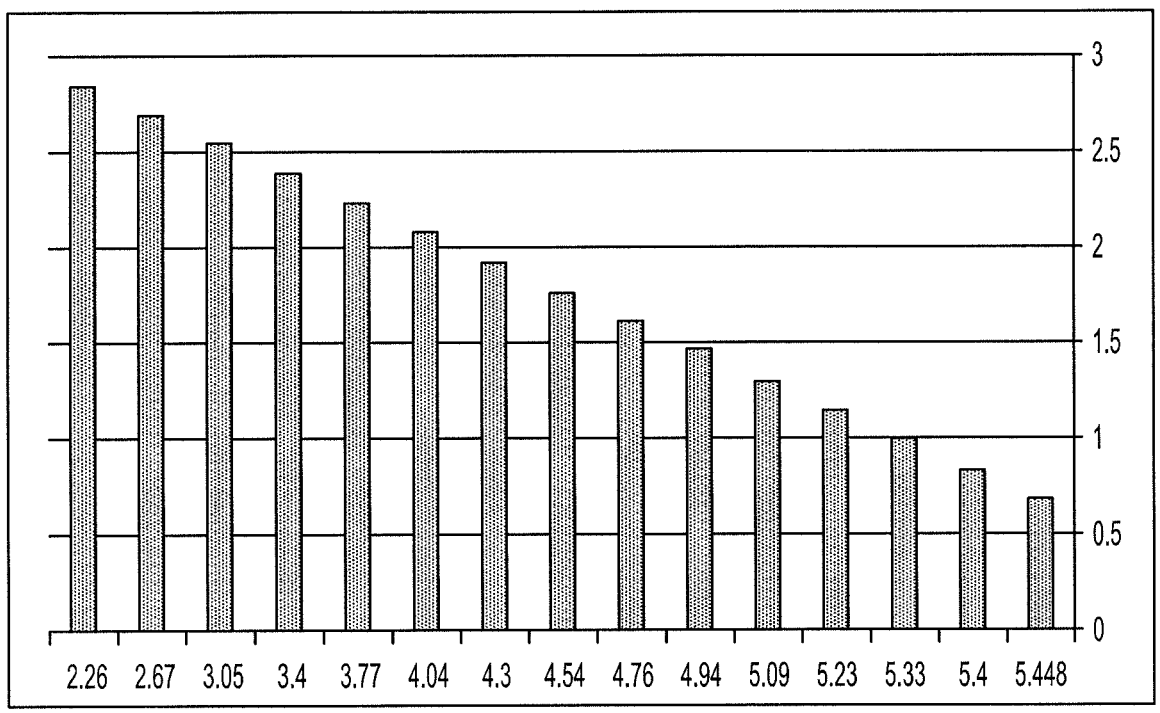
FIG. 10 is an example graph of the numerical values of the test parameters of an experimental setup according to an aspect of the invention.

For exposure time setting, since the size of the accumulation image is relatively small, the average exposure energy of each pixel is relatively high. Thus, the accumulation surface is easily overcured. To build features with high-resolution micro-features on the surface of processing object, the exposure time should be set with a suitable value. Based on experiments, the exposure time has relationship with the size of the illumination area of the accumulation image. For example, just for a test case of the texture using anti-tetrahedrons, the size of the illumination area of accumulation image changed gradually, as shown in FIG. 10. Numerical values of the test parameters of experiment are shown in Table 1, and illustrated graphically in FIG. 10 for example.

TABLE 1

Test Parameter for the process 900

| Num | Illumination time (s) | Accumulation speed (mm/s) | Illumination area of accumulation image (mm²) |
|---|---|---|---|
| 1 | 0.7 | 0.014285714 | 5.448 |
| 2 | 0.853571429 | 0.011715481 | 5.4 |
| 3 | 1.007142857 | 0.009929078 | 5.33 |
| 4 | 1.160714286 | 0.008615385 | 5.23 |
| 5 | 1.314285714 | 0.007608696 | 5.09 |
| 6 | 1.467857143 | 0.006812652 | 4.94 |
| 7 | 1.621428571 | 0.006167401 | 4.76 |
| 8 | 1.775 | 0.005633803 | 4.54 |
| 9 | 1.928571429 | 0.005185185 | 4.3 |
| 10 | 2.082142857 | 0.004802744 | 4.04 |
| 11 | 2.235714286 | 0.004472843 | 3.77 |
| 12 | 2.389285714 | 0.004185351 | 3.4 |
| 13 | 2.542857143 | 0.003932584 | 3.05 |
| 14 | 2.696428571 | 0.003708609 | 2.67 |
| 15 | 2.85 | 0.003508772 | 2.26 |

With the increase of the illumination area of the accumulation image, the movement speed of processing objects increase and the exposure time of the accumulation tool can be reduced.

Figure 11:
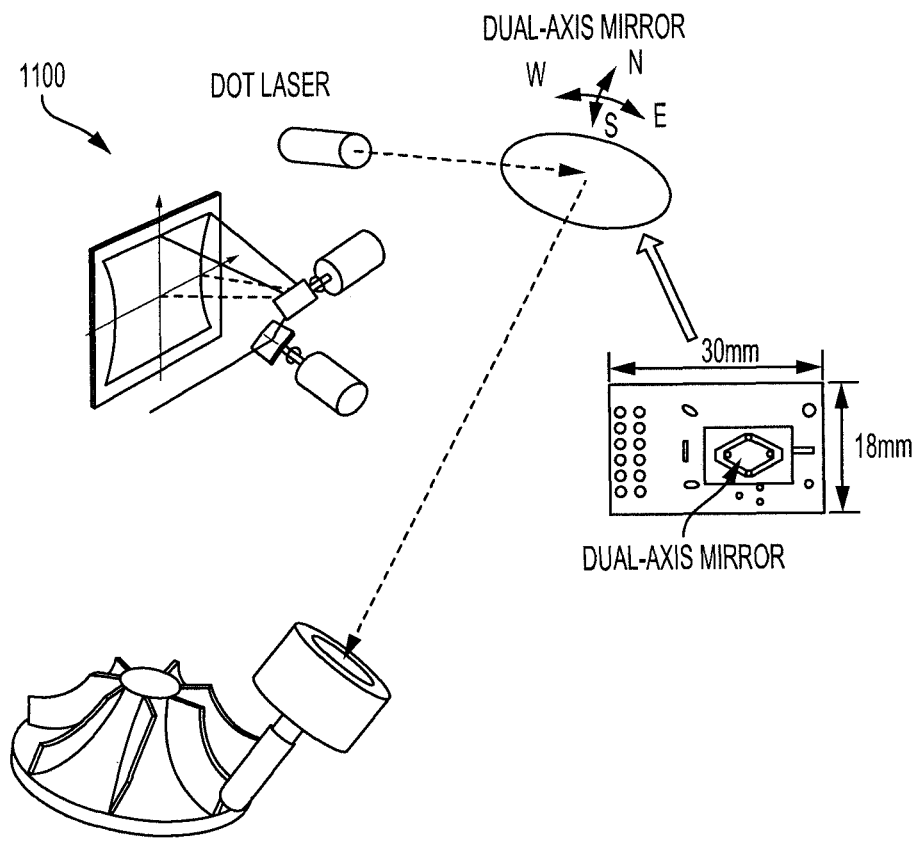
FIG. 11 is a concept diagram of an alternative imaging apparatus according to an aspect of the invention.

Instead of, or in addition to, a digital micro-mirror device to reflect lights from light source through a light guide, alternative apparatus may be used to direct light in a 2D pattern to the end of an accumulation tool. FIG. 11 shows a concept diagram of one such alternative apparatus 1100, based on a laser and dual axis mirror. The apparatus 1100 may include a laser and a dual-axis mirror that can be controlled to rotate in two axes, as shown in FIG. 11. The two axis mirror may be, for example, a galvano mirror system.

Figure 12:
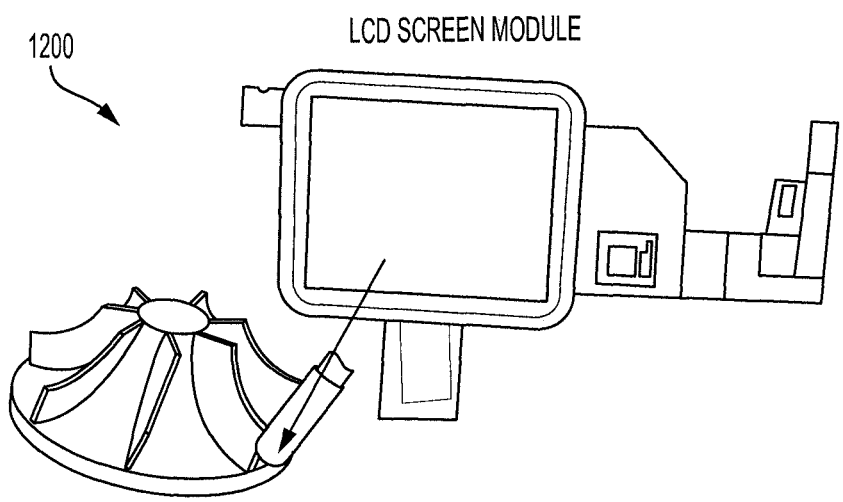
FIG. 12 is a concept diagram of another alternative imaging apparatus according to an aspect of the invention.

FIG. 12 shows another alternative apparatus 1200, based on an LCD screen. The apparatus 1200 may include a liquid crystal display (LCD) screen that can be directly put on the tip of the accumulation tool to control the input surface light, as shown in FIG. 12. Either apparatus 1200 or 1100 may be used instead of the DMD-based light guide tool for surface accumulation, if desired.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A method for multi-axis additive manufacturing using light emitted over a two-dimensional surface of a tool, comprising:
   determining, using a visual detection apparatus, an initial position of a platform holding an object with a solid accumulation surface based on a color of stereolithography (SLA) resin in an image of the SLA resin;
   immersing the solid accumulation surface in the SLA resin;
   positioning a free end of a light-emitting arm within the SLA resin and to within an initial distance of the solid accumulation surface under the SLA resin; and
   emitting a two-dimensional light pattern including an image that is projected from a digital micro-mirror device (DMD) through the free end of the light-emitting arm that is within the SLA resin and onto a portion of the SLA resin to cure the portion of the SLA resin between an area of the free end and the solid accumulation surface.

2. The method of claim 1, wherein the light-emitting arm comprises a tubular light guide formed from a rod of optically transmissive material, and emitting the two-dimensional light pattern comprises projecting the image from the digital micro-mirror device (DMD) to the free end of the light-emitting arm via one or more lenses.

3. The method of claim 1, wherein the free end of the light emitting arm is covered by a transparent coating that prevents the SLA resin from adhering to the free end.

4. The method of claim 1, further comprising moving the free end of the light emitting arm over the solid accumulation surface at a controlled distance using a numerically controlled multi-axis actuator while emitting the two-dimensional light pattern, causing a layer of cured SLA resin to form over a surface of the solid accumulation surface in a pattern that corresponds to the two-dimensional light pattern.

5. The method of claim 4, further comprising moving the free end of the light emitting arm over at least a portion of the layer of cured SLA resin at the controlled distance using the numerically controlled multi-axis actuator while emitting the two-dimensional light pattern, thereby forming an additional layer of cured SLA resin.

6. The method of claim 5, further comprising building up a three-dimensional structure of cured SLA resin over the surface of the solid accumulation surface formed of multiple layers of cured SLA resin each formed by moving the free end of the light emitting arm over at least a portion of an underlying layer of cured SLA resin at the controlled distance using the numerically controlled multi-axis actuator while emitting the two-dimensional light pattern.

7. The method of claim 1, wherein the solid accumulation surface comprises an article of manufacture having one or more surfaces that are not parallel to an upper surface of the SLA resin.

8. The method of claim 7, further comprising moving the free end of the light emitting arm over a surface of the article of manufacture at a controlled distance using a numerically controlled multi-axis actuator while emitting the two-dimensional light pattern, causing a layer of cured SLA resin to form over the surface of the article of manufacture in a pattern that corresponds to the two-dimensional light pattern.

9. The method of claim 8, further comprising moving the free end of the light emitting arm over at least a portion of the layer of cured SLA resin at the controlled distance using the numerically controlled multi-axis actuator while emitting the two-dimensional light pattern, thereby forming an additional layer of cured SLA resin.

10. The method of claim 9, further comprising building up a three-dimensional structure of cured SLA resin over the surface of the article of manufacture formed of multiple layers of cured SLA resin each formed by moving the free end of the light emitting arm over at least a portion of an underlying layer of cured SLA resin at the controlled distance using the numerically controlled multi-axis actuator while emitting the two-dimensional light pattern.

11. The method of claim 1, further comprising:
capturing, using the visual detection apparatus, the image of the SLA resin.

12. The method of claim 11, wherein the light-emitting arm comprises a hollow tube, and emitting the two-dimensional light pattern comprises beaming a numerically-controlled laser in the two-dimensional light pattern to the free end.

13. The method of claim 11, wherein the light-emitting arm comprises an array of light emitters arranged in a screen device at the free end, and emitting the two-dimensional light pattern comprises transmitting an electronic signal to the screen device, causing it to emit the two-dimensional light pattern.

14. The method of claim 13, wherein the array of light emitters comprises one or more of light-emitting diodes (LEDs) and a liquid-crystal display (LCD) device.

15. A method for multi-axis additive manufacturing, comprising:
determining, using a visual detection apparatus, an initial position of a platform holding an object with a solid accumulation surface based on a color of stereolithography (SLA) resin in an image of the SLA resin;
moving the platform holding the object to immerse the solid accumulation surface of the object into the SLA resin that is held within a substrate holder;
positioning a free end of a light-emitting arm underneath the solid accumulation surface of the object and to within an initial distance of the solid accumulation surface of the object under the SLA resin; and
emitting a two-dimensional light pattern from an area of the free end of the light-emitting arm that is underneath the object to cure a portion of the SLA resin between the area of the free end and the solid accumulation surface.

16. A method for multi-axis additive manufacturing, comprising:
immersing a solid accumulation surface of an object in resin that is held within a substrate holder;
positioning a free end of a light-emitting arm in different directions and orientations including above the solid accumulation surface of the object and to within an initial distance of the solid accumulation surface of the object under the SLA resin;
emitting a two-dimensional light pattern including an image from a digital micro-mirror device (DMD) or a liquid-crystal display (LCD) through the free end of the light-emitting arm to cure a portion of the SLA resin between an area of the free end and the solid accumulation surface of the object; and
forming micro-features on top of the solid accumulation surface of the object.

17. The method of claim 16, further comprising:
setting an exposure time based on a size of an area that is illuminated, wherein forming the micro-features on top of the solid accumulation surface of the object is based on the exposure time.

* * * * *